H. VOLKMAN.
HAND TRUCK.
APPLICATION FILED APR. 30, 1921.
1,416,427.
Patented May 16, 1922.
2 SHEETS—SHEET 1.
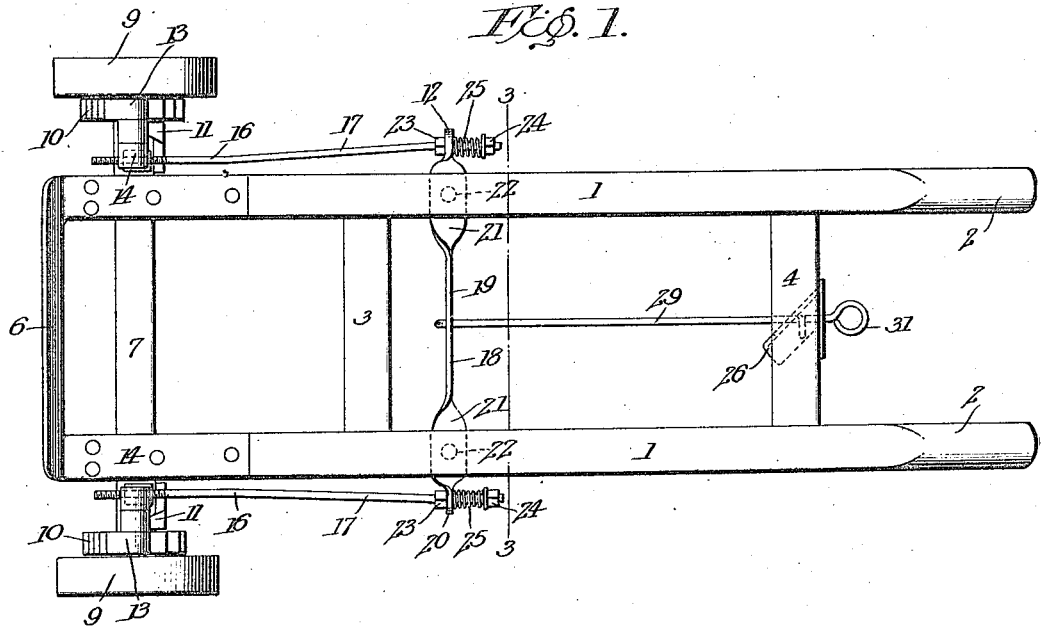
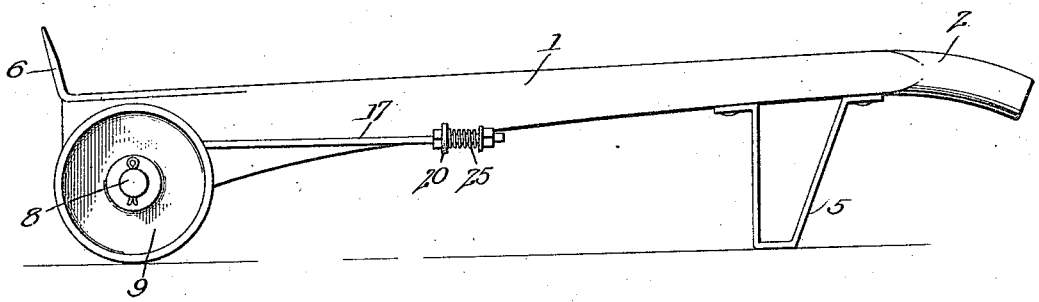
Henry VOLKMAN,
INVENTOR
BY *Victor J. Evans*
ATTORNEY
WITNESS:

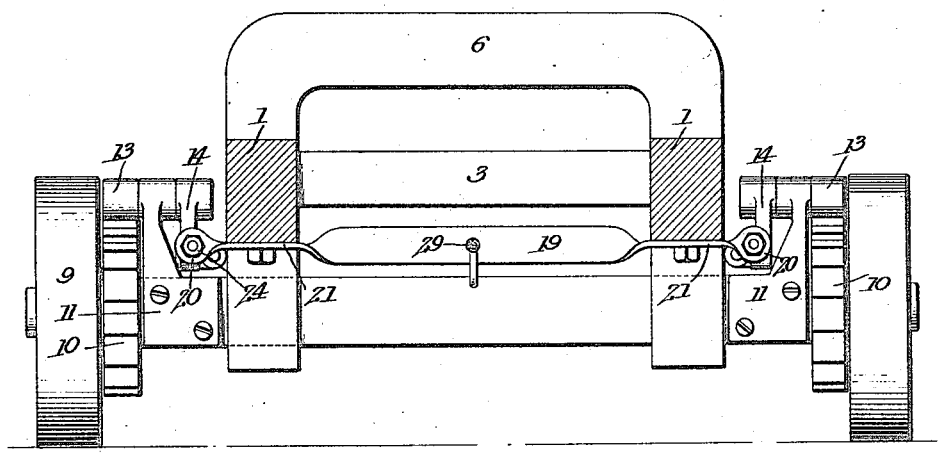
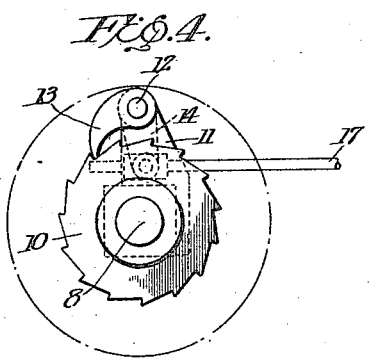
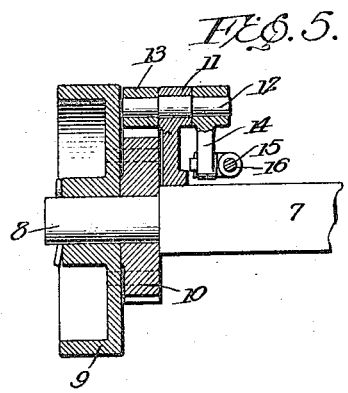
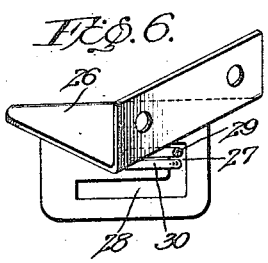

UNITED STATES PATENT OFFICE.

HENRY VOLKMAN, OF MANCHESTER, NEW HAMPSHIRE.

HAND TRUCK.

1,416,427.   Specification of Letters Patent.   Patented May 16, 1922.

Application filed April 30, 1921. Serial No. 465,807.

*To all whom it may concern:*

Be it known that I, HENRY VOLKMAN, a citizen of the United States, residing at Manchester, in the county of Hillsborough and State of New Hampshire, have invented new and useful Improvements in Hand Trucks, of which the following is a specification.

The object of my present invention is the provision of a hand truck equipped with simple, durable and compact means through the medium of which the operator of the truck while positioned adjacent to the handles may either lock or unlock the truck wheels, the locking of the wheels against rotation being advantageous during loading of the truck inasmuch as it precludes casual movement of the truck.

To the attainment of the foregoing, the invention consists in the improvement as hereinafter described and definitely claimed.

In the accompanying drawings, forming part of this specification:—

Figure 1 is a plan view of a truck constructed in accordance with my invention.

Figure 2 is a side elevation of the truck.

Figure 3 is a section taken in the plane indicated by the line 3—3 of Figure 1, looking forwardly.

Figure 4 is an enlarged detail view showing the locking mechanism at the inner side of and adjacent to each wheel of the truck.

Figure 5 is a section through said mechanism.

Figure 6 is a detail view illustrating the relative arrangement of the longitudinal handle rod and the enlargement thereon, and the keeper on the truck frame.

Similar numerals of reference designate corresponding parts in all of the views of the drawings.

Among other elements the truck comprises side bars 1 with handles 2 at their rear ends. The truck also comprises cross bars 3 and 4 between the side bars 1, legs 5 fixed to and depending from the rear portions of the side bars 1, and a rest 6, preferably of metal carried by the forward portions of the side bars 1.

Fixed to the forward portions of the side bars 1 is an axle 7, provided at its ends with spindles 8 on which are mounted ground wheels 9 with ratchet wheels 10 fixed with respect to their inner sides. Fixed to and rising from the axle 7 are standards 11, and journaled in the upper portions of the said standards 11 are rock shafts 12 with pawls 13 on their outer portions and pendent cranks 14 on their inner portions. The said cranks 14 are provided with lateral inwardly directed apertured lugs 15, and threaded through said lugs 15 and thereby adjustably connected thereto are the forward threaded portions 16 of longitudinal rods 17, the said rods 17 being arranged in substantial parallelism with the side bars 1.

Arranged transversely below the side bars 1 at a suitable distance in rear of the axle 7 is a resilient bar 18 that constitutes an important element of my invention. The said bar 18 comprises a vertically disposed intermediate portion 19, vertically disposed and apertured end portions 20 and horizontal intermediate portions 21, the latter being pivotally connected at 22 to the undersides of the side bars 1. The longitudinal rods 17 extend through the apertures in the bar portions 20 and are provided in front of said bar portions 20 with enlargements of abutments 23. Threaded on the rear end portions of the rods 17 are nuts 24, and interposed between the said nuts 24 and the bar portions 20 are coiled springs 25, supported by the rods 17 and designed to yieldingly hold the abutments 23 against the forward sides of the bar portions 20 so that rearward movement of the intermediate portion 19 of the bar 18 will be immediately attended by forward and upward movement of the pawls 13 to unlock the ground wheels 9 and render said wheels free to rotate for the movement of the truck from one point to another. It will be noted, however, that normally because of the end portions 20 of the bar 18 pressing forwardly against the abutments 23, the pawls 13 will be held yieldingly in engagement with the ratchet wheels 10 so as to effectively prevent rearward rotation of the ground wheels 9 without preventing forward rotation of said ground wheels.

Carried at the underside of the rear cross bar 4 of the truck is a keeper plate 26. The said keeper plate 26 is disposed at about the angle illustrated to the longitudinal center of the truck and is provided with an upright slot 27 and with a slot 28 which extends in the direction of the length of the keeper plate 26 and communicates at one end with the upright slot 27. Connected to the bar 18 at about the center thereof and extending rearwardly from said bar 18 and through the keeper plate 26 is a handle rod, 29 provided with an enlargement 30 and with a hand grasp 31 in rear of said enlargement 30. Manifestly when the handle rod 29 is drawn rearwardly to rearwardly bend the intermediate portion 19 of the resilient bar 18, the pawls 13 will be lifted clear of the ratchet wheels 10, and when the handle rod 29 is positioned in the upright slot 27 of the keeper plate 26 with the enlargement 30 in rear of the said keeper plate 26, the pawls 13 will manifestly be retained out of engagement with the ratchet wheels 10. It will be noted, however, that when the handle rod 29 is moved out of the upright slot 27 and into the other slot 28, the enlargement 30 will be free to move forwardly and laterally of the truck and in consequence the intermediate portion 19 of the bar 18 will resume its normal state and by bending forwardly will enable the end portions 20 of the bar 18 and the coiled springs 25 to draw the longitudinal rods 17 rearwardly and thereby place the pawls 13 in yielding engagement with the ratchet wheels 10.

It will be apparent from the foregoing that notwithstanding the practical advantages of my novel truck as set forth in the foregoing, the truck is simple and strong in construction and is but little more expensive than trucks of corresponding character extent.

I have entered into a detailed description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters Patent, is:—

1. A truck comprising side bars, a cross bar interposed between and fixed with respect to the rear portions of said side bars, a keeper plate carried at the underside of said cross bar and disposed at an angle to the longitudinal center of the truck and having an upright slot and also having a slot communicating with and extending from the first-named slot in the direction of the length of the plate, an axle carried by said side bars and having spindles, ground wheels mounted on the said spindles and having ratchet wheels at their inner sides, standards carried by the axle at the inner sides of the ratchet wheels, rock shafts journaled in said standards and having pawls on their outer portions and pendent cranks on their inner portions, longitudinal rods connected to and extending rearwardly from said cranks and having abutments spaced from their rear end, a resilient cross bar having a vertically disposed intermediate portion, horizontally disposed portions at the ends of said intermediate portion and arranged under and pivotally connected to the side bars and vertically disposed end portions with apertures receiving the longitudinal rods in rear of the abutments thereon, coiled springs mounted on the longitudinal rods in rear of the resilient bar and interposed between the bar and rear abutments on the rods, and a longitudinal handle rod connected to and extending rearwardly from the intermediate portion of the resilient bar and through the slotted keeper plate and having enlargement disposed in rear of said plate.

2. In a truck the combination of a frame provided with an axle, ground wheels mounted on said axle and having ratchet wheels at their inner sides, standards on the axle, rock shafts journaled in said standards and having outer pawls and inner cranks, rods connected to and extending rearwardly from the cranks and provided with abutments spaced from their rear ends, a resilient cross bar having an intermediate vertically disposed portion, horizontal portions at the ends of said resilient portion and pivoted to the frame, and vertically disposed apertured end portions receiving the rods in rear of the abutments thereon, and coiled springs on the rods and interposed between the end portions of the cross bar and rear abutments on the rods, whereby when the intermediate portion of the cross bar is moved rearwardly the pawls will be lifted clear of the ratchet wheels and when the intermediate portion of the cross bar is released the pawls will be placed in yielding engagement with the ratchet wheels.

3. The combination in a truck, of a wheel supported frame, ratchet wheels fixed with respect to the wheels of the frame, longitudinally movable rods, pawls connected with and movable by said rods, a resilient cross bar carried by the frame and connected with the longitudinal rods, and means adjacent to the rear portion of the frame and under the control of the operator to bend the central portion of the resilient bar rearwardly and hold it against springing forwardly.

4. The combination in a truck of a wheeled frame, ratchet wheels carried by the wheels of the frame, pawls to cooperate with said ratchet wheels, resilient means carried by the frame and connected with the pawls, and means connected with the resilient means and located at the rear portion of the frame for manipulating the resilient means and for securing the same against operation.

In testimony whereof I affix my signature.

HENRY VOLKMAN.